Sept. 11, 1934.    K. ZWICK    1,972,910
COPYING AND ENGRAVING MACHINE
Filed May 12, 1932

Inventor:
Kurt Zwick
by:
Edward H. Cumpston
his Attorney.

Patented Sept. 11, 1934

1,972,910

UNITED STATES PATENT OFFICE 1,972,910

COPYING AND ENGRAVING MACHINE

Kurt Zwick, Munich, Germany, assignor to the firm Friedrich Deckel Prazisions-mechanik und Maschinenbau, Munich, Germany Application May 12, 1932, Serial No. 610,966
In Germany May 16, 1931

14 Claims. (Cl. 90—13.1)

This invention relates to copying or engraving machines of the type employing a pantograph mechanism for holding and guiding the tool, the pantograph mechanism being movable about a vertical axis to shift the tool substantially horizontally and the mechanism as a whole being movable about a horizontal axis to shift the tool substantially vertically. The pantograph mechanism carries a beam or tool carrier in which are mounted a tracer point or guide pin and one or more tools.

With such a machine, one or several copies of the same size can be made from a model or pattern with great accuracy. The guide pin or tracer point is moved over the model or pattern, and the tool or tools are given corresponding movements, since the pantograph mechanism assures parallel movement of the beam carrying the guide pin and tools.

Heretofore, in machines of this character it has usually been necessary to guide the pantograph and move the tool directly by hand, which is fatiguing to the operator especially where heavy cutting is necessary. An object of the present invention is to overcome this difficulty and to provide a machine which can be used more advantageously and with less fatigue to the operator.

This is accomplished by providing means for blocking the movement of the pantograph mechanism about the vertical axis, so as to hold the pantograph mechanism stationary, and also means for blocking the oscillation of the pantograph mechanism about the horizontal axis, and further by providing screw feeds or the like for moving the work and tool relative to each other. In this way, the pantograph mechanism can be held rigidly and the heavy cutting can be accomplished by the use of the screw feeds, operated either by hand or by a special drive, so that the operation is much less tiring to the operator than if he had to guide the freely movable pantograph mechanism directly by hand.

After the heavy cutting or roughing out operation on the work has been finished, the blocking means can be removed in order to free the pantograph mechanism for movement about either the vertical axis or the horizontal axis or both, and the final finishing of the work can be accomplished by guiding the pantograph mechanism by hand in the usual manner.

In this connection, it is a further object of the invention to provide simple and satisfactory blocking means of the above character, so designed that either the means for blocking movement about the horizontal axis or the means for block movement about the vertical axis may be used alone, or both may be used together.

A further object of the invention is the provision of simplified and improved pantograph mechanism for machines of this character.

A still further object is the provision of a copying or engraving machine having suitable movable tables and slides whereby the work and tool may be moved relatively to each other in all three dimensions even when the pantograph mechanism is blocked as above set forth, and the provision of improved and satisfactory feeding means for operating the tables and slides.

It is also an object of the invention to provide a simplified and advantageous method of performing cutting or similar operations on machines of the above mentioned character, which method comprises the blocking of the pantograph mechanism while doing the heavy cutting or roughing out of the work, and the release of the pantograph mechanism for free movement when finishing the work.

To these and other ends the invention resides in certain improvements and combinations of parts, all as will be hereinafter more fully described, the novel features being pointed out in the claims at the end of the specification.

In the drawing.

The same reference numerals throughout the several views indicate the same parts.

Figure 1:
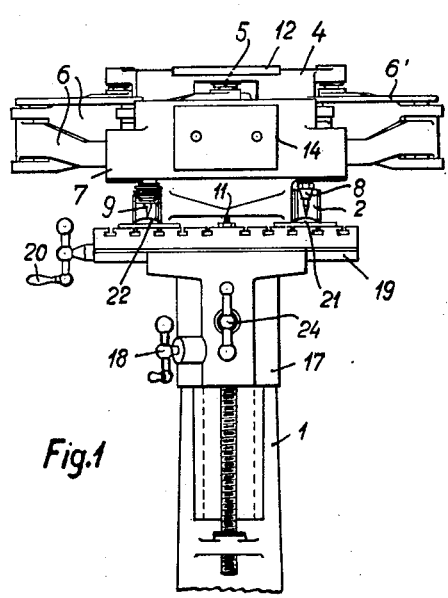
Fig. 1 is a front view of a portion of a machine constructed in accordance with a preferred embodiment of the invention.

Referring now to the drawing, which is somewhat diagrammatic, the machine comprises a column or frame 1 on which a slide 2 is mounted for horizontal movement from front to back of the machine. This slide 2 carries a substantially horizontal shaft 3 on which is pivotally mounted a support 4 for the pantograph mechanism. The support 4 carries the main vertical pivot 5 at its center and a supplementary vertical pivot near each end.

The pantograph mechanism includes links 6 pivoted at their rear ends on the main vertical pivot and supplementary vertical pivots, and at their front ends on suitable pivots on the beam or tool carrier 7. This pantograph mechanism has two pairs of links, each link having a joint at its mid point, and the joint of each link is connected by a link 6′ with the intermediate joint of the other link of the same pair, as plainly shown in Fig. 3.

The distances between the link pivots on the beam 7 are the same as the corresponding distances between the pivots on the support 4, and the links 6' hold the intermediate joints of each pair of links spaced from each other at the same distances as the distance from the pivot 5 to either of the other pivots at the ends of the support 4. From these facts, and from a study of Fig. 3, it is clearly apparent that the pantograph mechanism insures parallel movement of the beam 7, keeping it always parallel to the axis 3, although allowing this beam to move freely longitudinally or laterally.

Near one end of the beam 7 is a tracer point or guide pin 8 for contact with the model or pattern, and the beam also carries one or more tools 9 driven in any suitable manner by belts or the like. The tools 9 and tracer point 8 are removable so that engraving tools, milling cutters, or other forms of tools may be used as desired, and appropriate changes can be made in the tracer point.

Figure 2:
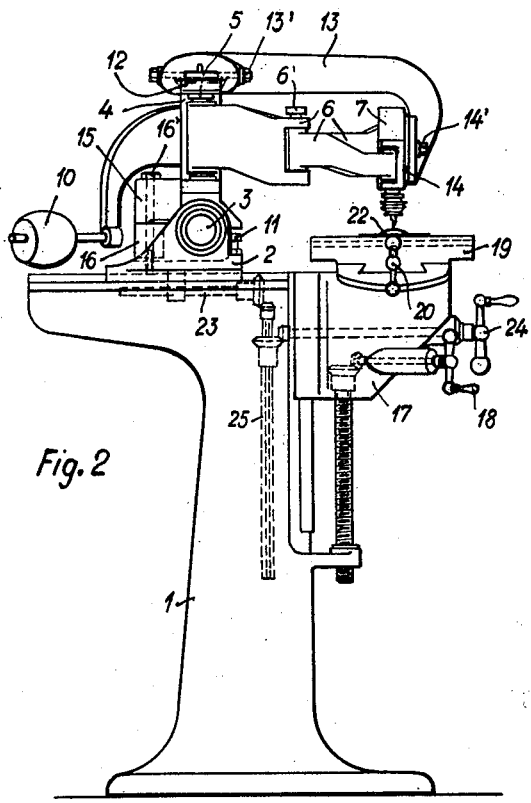
Fig. 2 is a side elevation thereof.
Figure 3:
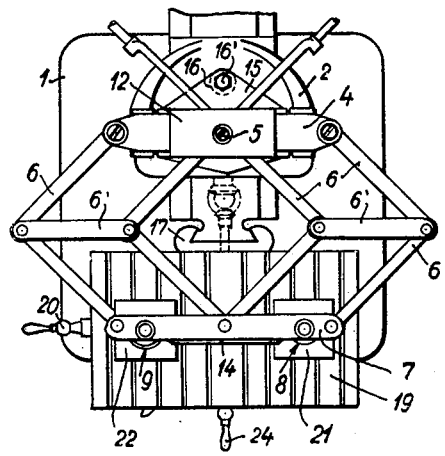
Fig. 3 is a plan view thereof.

Two of the link members 6 are extended rearwardly beyond the main pivot 5, as shown in Figs. 2 and 3, and carry counterweights 10 slidable along the extensions so that they may be adjusted to vary the downward pressure of the tool.

The support 4 has a forwardly extending lip overlying an adjustable screw 11 (Figs. 1 and 2) which can be screwed up or down and which serves as a limit stop for the oscillation of the support 4 about the horizontal shaft 3. By suitable adjustment of the screw 11, the tool and guide pin can be held at any desired elevation.

The tool and tracer point can be moved horizontally because of the flexibility of the pantograph mechanism and can be moved vertically by oscillating the pantograph mechanism and the support 4 as a whole about the horizontal axis 3, but the movements of the tool will always correspond exactly to the movements of the tracer point so that if the tracer point is following a model or pattern, the tool will reproduce the model or pattern exactly. The movements are produced directly by hand, by the operator grasping the tracer point 8 or some other suitable part of the pantograph mechanism.

Blocking means is provided as above described, to block the movements of the pantograph mechanism either about the vertical axis or about the horizontal axis or both, as desired. Blocking means for holding the pantograph mechanism itself rigidly and preventing movement about the vertical axis comprises an arm 13 (Fig. 2) having at its rear end a dovetailed slot for fitting over a dovetailed guideway 12 at the top of the support 4. The arm is slotted above the dovetailed slot as shown in Fig. 2, and clamping bolts 13' are provided for clamping the arm tightly onto the guideway 12.

The front end of the arm 13 is curved downwardly as shown in Fig. 2 and provided with a flange having a flat rear surface adapted to contact with a flat portion 14 on the front of the beam or tool carrier 7. Bolts 14' pass through openings in the flange on the arm 13 and are threaded into tapped openings in the part 14 of the beam 7, so that these parts may be rigidly secured together.

When the arm 13 is placed in its effective position and connected at its two ends to the parts 4 and 7, it is apparent that it holds the beam 7 rigidly with respect to the support 4 and prevents any movement of the pantograph mechanism about the vertical pivot 5. It does not, however, interfere with the oscillating movement of the support 4 and pantograph mechanism as a whole about the horizontal axis 3.

For blocking this latter movement to hold the parts against oscillation, the support 4 is provided with a rearward extension 15 overlying a part of the slide 2, and a block 16 may be inserted between the slide 2 and the extension 15 to fill the space between them. A screw 16' extends downwardly through the parts 15 and 16 and into a threaded aperture in the slide 2, so that these parts are held firmly together and thus movement about the horizontal axis 3 is prevented.

It is apparent that either the blocking member 13 or the blocking member 16 may be used independently to block one movement without affecting the other movement, or both of them may be used together to block off both the normal horizontal movement of the pantograph mechanism and also its oscillating movement about the axis 3, thus holding the tool and tracer point in fixed position relative to the slide 2.

At the front of the frame 1 are guideways on which a vertically movable slide 17 is arranged, which slide may be moved up and down by a suitable screw feed controlled by the crank handle 18. On this slide 17 is a horizontally movable work support or table 19 moving in a transverse direction from side to side of the machine and operated by a screw feed controlled by the handle 20. This work support 19 carries the model or pattern 21 and one or more pieces of work 22.

Also on the slide 17 is a crank handle 24 for rotating a beveled gear meshing with another beveled gear splined to a vertical shaft 25 mounted in the frame of the machine, which shaft, through suitable beveled gears, turns the screw feed 23 for controlling the back and forth movements of the slide 2.

In the use of this novel and improved machine according to the method of the present invention, the model and work are suitably secured to the work support 19. If any heavy cutting or roughing out operation is necessary, the blocking means 13 is placed in effective position, and also the blocking member 16 if desired, so that the pantograph mechanism is held stationary with relation to the slide 2 on which it is mounted. Then the roughing out of the work is accomplished by moving the work vertically and transversely relative to the tool by means of the cranks 18 and 20, and by moving the slide 2 and tool 9 backwards and forwards, if necessary, by means of the crank 24. These movements, all being accomplished by suitable screw feeds, are much less tiring to the operator than if it were necessary for him to leave the pantograph mechanism freely movable and to guide its movements directly by hand. Furthermore, suitable special drives, automatic or otherwise, can be provided for operating the above mentioned screw feeds if desired.

At the completion of the roughing out operation on the work, the blocking members 13 and 16 are removed from the machine so that the pantograph mechanism is freed for its normal horizontal movement about the vertical pivot 5 and for its vertical oscillation about the horizontal axis 3. The pantograph mechanism is then guided directly by hand in order to accomplish the final finishing of the work, which ordinarily does not involve extensive cutting and thus is not unduly fatiguing to the operator.

For some kinds of work, it may be desirable to employ only the blocking member 13 and not to employ the blocking member 16, thus leaving the pantograph mechanism free to oscillate about the horizontal axis 3 so that the tool may move up and down. The requisite cutting pressure may then be obtained by weight of the pantograph parts and may be varied by suitable adjustments of the counterweights 10, or springs or the like may be employed to increase the cutting pressure on the tool if desired.

When the blocking member 13 is employed, either with or without the use of the other blocking member 16, the work can be accomplished extremely rapidly because the tool, being rigidly supported against lateral deflection, is capable of removing much larger chips than when it is held simply by hand. Furthermore, when both the blocking members 13 and 16 are used, the machine is capable of being employed as a standard milling machine.

One of the important advantages of the use of the blocking members in the preliminary roughing out of the work and later freeing the pantograph mechanism for the final finishing operation, is that the preliminary roughing operation may be done as rapidly and efficiently as though it were accomplished on a milling machine, and the final finishing operation may be done with all the accuracy and care obtainable on a copying or engraving machine, and yet it is necessary to set the model and the work on the work support only a single time, without having to transfer them from a milling machine to an engraving machine. In this way the model and the work always remain in exactly the same fixed position relative to each other throughout the whole operation, obviating any errors of setting which might be introduced by shifting the model and work from one kind of machine to another.

When employing only the blocking member 16 without the use of the blocking member 13, the machine may be used as a standard flat or plate engraving machine, and all level engravings may be made by the horizontal movement of the pantograph mechanism.

Thus it is seen that the invention provides an efficient and improved machine capable of a great number of uses and one which, when used according to the preferred novel method above set forth, is extremely advantageous in sinking dies or other copying from a model.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. Apparatus comprising a frame, a support pivotally connected to said frame for oscillation relative thereto, pantograph mechanism mounted on said support, a tool carried by said pantograph mechanism and movable in a plane by moving said pantograph mechanism and movable transversely to said plane by oscillating said pantograph mechanism and support relative to said frame, and blocking means for holding said support against oscillation to maintain said tool in a predetermined plane while permitting free movement thereof in the plane.

2. A copying machine comprising a frame, a support pivotally connected to said frame for oscillation relative thereto about a substantially horizontal axis, pantograph mechanism mounted on said support for movement in a generally horizontal direction, a tool carried by said pantograph mechanism, and means rendered effective at will for locking said support against oscillation about said horizontal axis to hold said tool against substantial vertical movement.

3. Apparatus comprising a support, pantograph mechanism pivotally connected thereto, a tool carried by said pantograph mechanism and movable relative to said support upon movement of said pantograph mechanism, and means for blocking said pantograph mechanism against normal pantographic movement so as to hold said tool in fixed position relative to said support.

4. Apparatus comprising a support, a tool carrier, pantograph mechanism connecting the support to the tool carrier for supporting the tool carrier for parallel movement relative to the support, and blocking means connectable at will to said support and to said tool carrier to hold said support and carrier in fixed position relative to each other.

5. A copying machine comprising a support, a tool carrier, pantograph mechanism connecting said support and carrier for supporting the carrier for parallel movement relative to the support, and a substantially rigid blocking member detachably connected both to said support and to said tool carrier, so that said blocking member may be detached to provide free normal movement of said pantograph mechanism and tool carrier, and may be attached to prevent movement of said pantograph mechanism and hold said tool carrier in fixed position relative to said support.

6. A copying machine comprising a frame, a support pivotally connected to said frame for oscillation relative thereto about a substantially horizontal axis, pantograph mechanism mounted on said support for movement in a generally horizontal direction, a tool carrier mounted on said pantograph mechanism and movable in a generally horizontal direction by moving said pantograph mechanism and movable in a generally vertical direction by oscillating said support and pantograph mechanism about said horizontal axis, and blocking means connectable at will both to said support and to said tool carrier to hold them in fixed position relative to each other and to prevent said horizontal movement of said tool carrier while permitting said vertical movement thereof.

7. A copying machine comprising a frame, a support pivotally connected to said frame for oscillation relative thereto about a substantially horizontal axis, a tool carrier, pantograph mechanism connecting said tool carrier to said support to maintain said tool carrier parallel to said axis while permitting movement of the tool carrier in a generally horizontal direction, and blocking means effective at will to hold said support against oscillation about said axis and to hold said tool carrier in fixed position relative to said support.

8. Pantograph mechanism for engraving machines and the like, comprising a support, a beam, a tracer point and a tool both mounted on said beam, two pairs of links connecting said beam to said support, all of said links being mounted for oscillation substantially in the same plane, an intermediate joint in each link, and a tie member connecting the joint of each link to the joint of the other link of the same pair.

9. Pantograph mechanism for engraving machines and the like, comprising a support, a beam, a tracer point and a tool both mounted on said beam, a pair of parallel motion links connecting said beam to said support, said links being pivotally connected to said support to oscillate about different axes substantially parallel to and spaced from each other, and a second pair of parallel motion links likewise connecting said beam to said support, the two links of said second pair being pivotally connected to said support to oscillate about different axes substantially parallel to and spaced from each other, at least one of said axes of said second pair of links being spaced from both of said axes of said first pair of links.

10. Pantograph mechanism for engraving machines and the like, comprising a support, a beam, a tracer point and a tool both mounted on said beam, a pair of parallel motion links connecting said beam to said support, said links being pivotally connected to said support to oscillate about different axes substantially parallel to and spaced from each other, and a second pair of parallel motion links likewise connecting said beam to said support, the two links of said second pair being pivotally connected to said support to oscillate about different axes substantially parallel to and spaced from each other, one of said axes of said second pair of links being spaced from both of said axes of said first pair of links, and the other of said axes of said second pair of links being substantially identical with one of said axes of said first pair of links.

11. A copying machine comprising a frame, a work support mounted on said frame, a slide movably mounted on said frame independently of said work support, pantograph mechanism carried by said slide, and a tool carried by said pantograph mechanism for operating upon work held by said work support, said tool being movable relative to said work by operating said pantograph mechanism, and said tool and pantograph mechanism being bodily movable relative to said work by shifting said slide.

12. A copying machine comprising a frame, a slide mounted thereon for substantially vertical movement, a work support mounted for substantially horizontal movement on said slide, a second slide mounted on said frame for substantially horizontal movement in a direction transverse to the direction of movement of said work support, pantograph mechanism carried by said second slide, and a tool mounted on said pantograph mechanism for cooperation with work held by said work support.

13. A copying machine comprising a frame, a slide mounted thereon for substantially vertical movement, work supporting means mounted on said slide, a second slide mounted on said frame for substantially horizontal movement, pantograph mechanism carried by said second slide, a tool mounted on said pantograph mechanism for cooperation with work held by said supporting means, and means mounted on said vertically movable slide for causing movement of said horizontally movable slide.

14. A copying machine comprising a frame, a slide mounted thereon for substantially vertical movement, work supporting means mounted on said slide, a second slide mounted on said frame for substantially horizontal movement, pantograph mechanism carried by said second slide, a tool mounted on said pantograph mechanism for cooperation with work held by said supporting means, a substantially vertical shaft rotatably mounted on said frame and operatively connected to said second slide to cause substantially horizontal movement thereof, a gear mounted on and slidable longitudinally along said shaft, a rotatable operating member mounted on said vertically movable slide for bodily movement therewith, and a second gear operatively connected to said rotatable operating member, said second gear meshing with said gear on said vertical shaft, so that rotation of said operating member in any vertically adjusted position of said vertically movable slide will cause rotation of said shaft and shift said horizontally movable slide.

KURT ZWICK.